(12) United States Patent
Lee et al.

(10) Patent No.: US 10,497,930 B2
(45) Date of Patent: Dec. 3, 2019

(54) ANODE COMPRISING MULTIPLE PROTECTIVE LAYERS, AND LITHIUM SECONDARY BATTERY COMPRISING SAME

(71) Applicant: LG CHEM, LTD., Seoul (KR)

(72) Inventors: Hye Jin Lee, Daejeon (KR); Kyung Hwa Woo, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 16/079,665

(22) PCT Filed: Aug. 18, 2017

(86) PCT No.: PCT/KR2017/008995
§ 371 (c)(1),
(2) Date: Aug. 24, 2018

(87) PCT Pub. No.: WO2018/034526
PCT Pub. Date: Feb. 22, 2018

(65) Prior Publication Data
US 2019/0058185 A1    Feb. 21, 2019

(30) Foreign Application Priority Data
Aug. 19, 2016  (KR) .................. 10-2016-0105197

(51) Int. Cl.
| H01M 6/04 | (2006.01) |
| H01M 4/133 | (2010.01) |
| H01M 10/0525 | (2010.01) |
| H01M 4/139 | (2010.01) |
| H01M 4/40 | (2006.01) |
| H01M 4/66 | (2006.01) |
| H01M 4/02 | (2006.01) |

(52) U.S. Cl.
CPC ........... *H01M 4/133* (2013.01); *H01M 4/139* (2013.01); *H01M 4/405* (2013.01); *H01M 4/661* (2013.01); *H01M 4/667* (2013.01); *H01M 10/0525* (2013.01); *H01M 2004/027* (2013.01)

(58) Field of Classification Search
CPC ...... H01M 4/133; H01M 4/139; H01M 4/405; H01M 4/661; H01M 4/667; H01M 10/0525; H01M 10/052; H01M 2004/0277
See application file for complete search history.

(56) References Cited

U.S. PATENT DOCUMENTS

| 8,765,303 B2 * | 7/2014 | Chen ..................... H01M 4/133 429/221 |
| 2003/0143453 A1 | 7/2003 | Ren et al. |
| 2004/0058232 A1 | 3/2004 | Kim et al. |
| 2005/0042450 A1 | 2/2005 | Sano et al. |
| 2005/0095504 A1 | 5/2005 | Kim et al. |
| 2011/0171371 A1 * | 7/2011 | Li ........................ B82Y 30/00 427/122 |
| 2014/0332731 A1 * | 11/2014 | Ma ......................... H01B 1/04 252/506 |
| 2014/0370351 A1 | 12/2014 | Kwon et al. |
| 2016/0020462 A1 | 1/2016 | Yang |
| 2016/0149212 A1 | 5/2016 | Zaghib et al. |
| 2016/0315313 A1 * | 10/2016 | Suzuki ............... H01M 4/0438 |

FOREIGN PATENT DOCUMENTS

| JP | 2003-515893 A | 5/2003 |
| JP | 2005-50669 A | 2/2005 |
| JP | 2005-142156 A | 6/2005 |
| JP | 2009-245887 A | 10/2009 |
| JP | 2010-009773 A | 1/2010 |
| KR | 10-2004-0026208 A | 3/2004 |
| KR | 10-1203376 B1 | 11/2012 |
| KR | 10-2014-0112597 A | 9/2014 |
| KR | 10-2015-0063340 A | 6/2015 |
| KR | 10-2016-0009511 A | 1/2016 |
| KR | 10-2016-0023653 A | 3/2016 |
| KR | 10-2016-0037636 A | 4/2016 |
| WO | WO 01/39302 A1 | 5/2001 |
| WO | WO 2007/111895 A2 | 10/2007 |
| WO | WO 2007/111901 A2 | 10/2007 |

OTHER PUBLICATIONS

Extended European Search Report for European Application No. 17841708.5, dated May 7, 2019.
Wang et al., "Enhanced rate capability and cycle stability of lithium-sulfur batteries with a bifunctional MCNT@PEG-modified separator," Journal of Materials Chemistry A, vol. No. 3, Issue No. 13, Feb. 17, 2015, pp. 7139-7144, XP055583452, GB.
International Search Report for PCT/KR2017/008995 (PCT/ISA/210) dated Nov. 27, 2017.
Zhang et al., "Modified secondary lithium metal batteries with the polyaniline-carbon nanotube composite buffer layer", Chemical Communications, 2015, vol. 51, pp. 322-325.

* cited by examiner

*Primary Examiner* — Raymond Alejandro

(74) *Attorney, Agent, or Firm* — Birch, Stewart, Kolasch & Birch, LLP

(57) ABSTRACT

The present invention relates to a negative electrode including a multi-protective layer and a lithium secondary battery including the same, and the multi-protective layer prevents lithium dendrite growth on a surface of the electrode, and does not cause overpotential during charge and discharge since the protective layer itself does not function as a resistive layer, and therefore, is capable of preventing battery performance decline and securing stability when operating a battery.

9 Claims, 4 Drawing Sheets

【Figure 1】
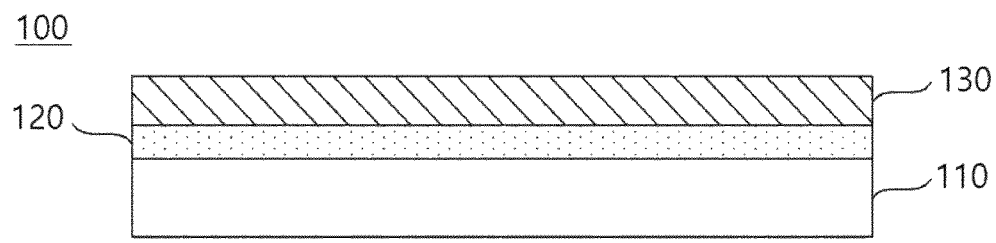
【Figure 2】
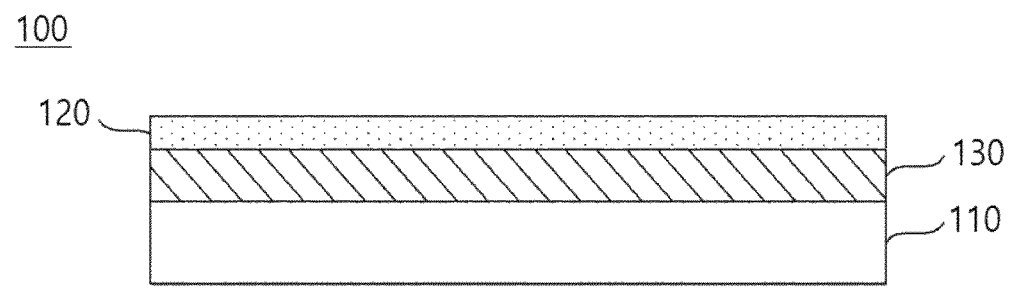
【Figure 3】
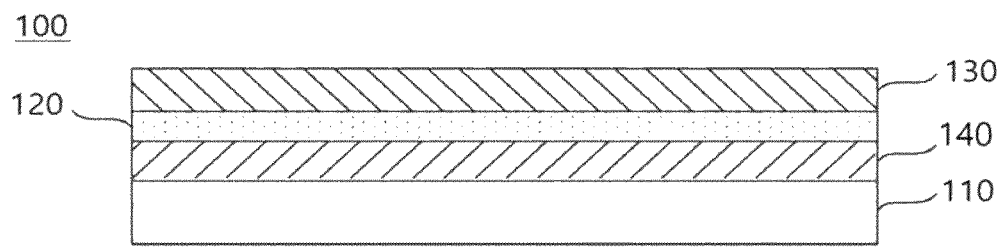

【Figure 4】
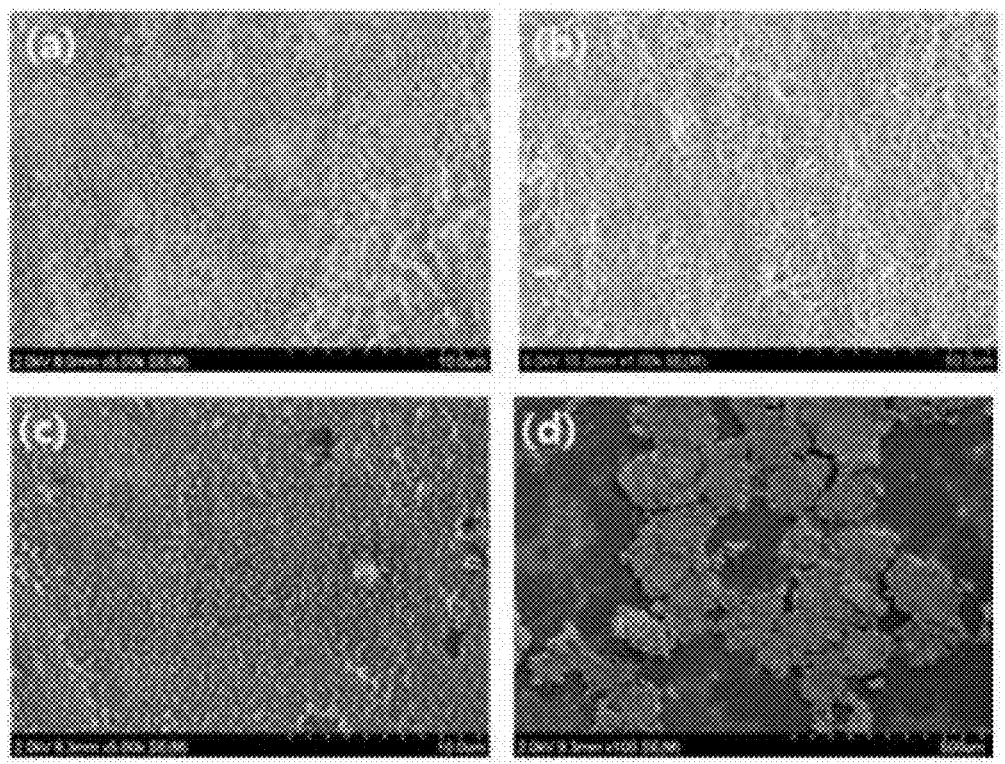

【Figure 5】
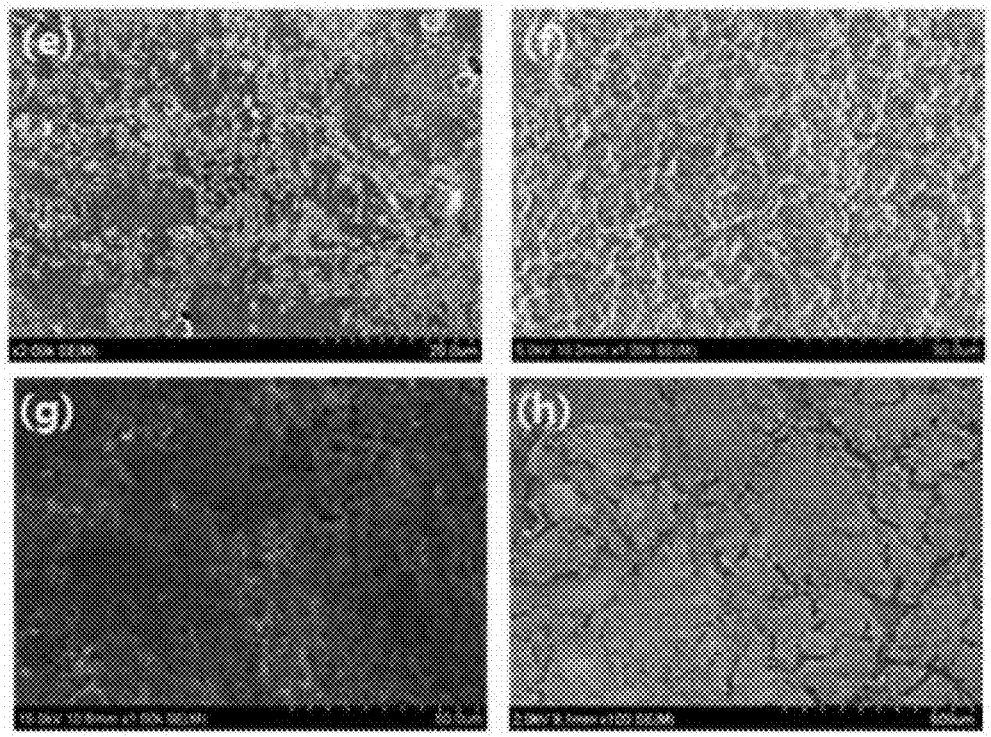
【Figure 6】
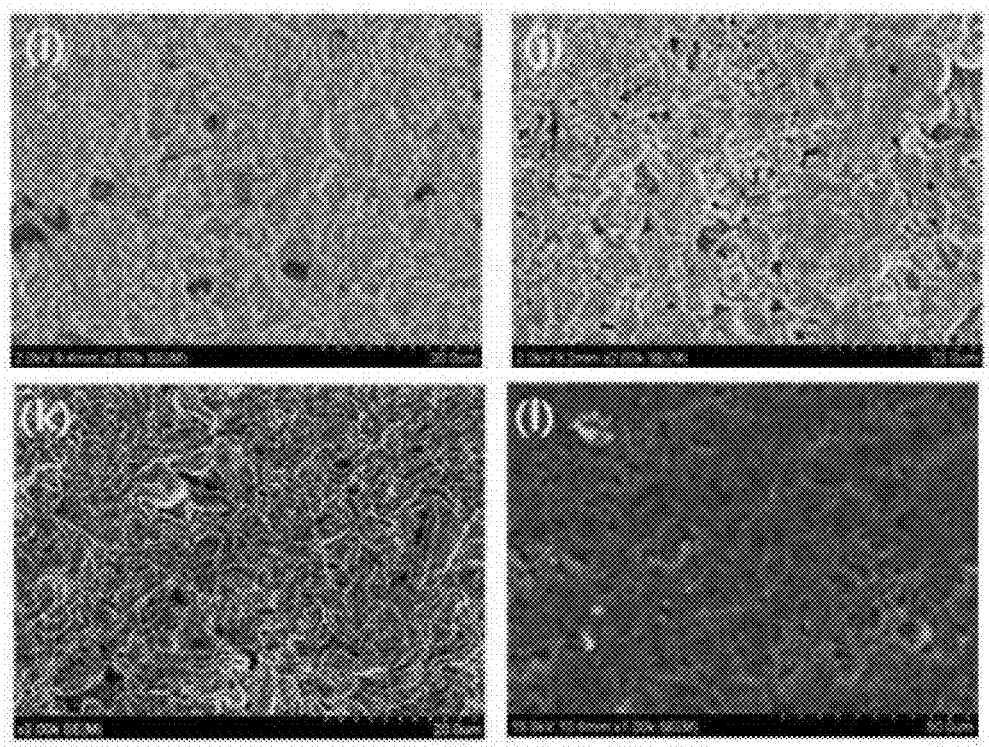

【Figure 7】
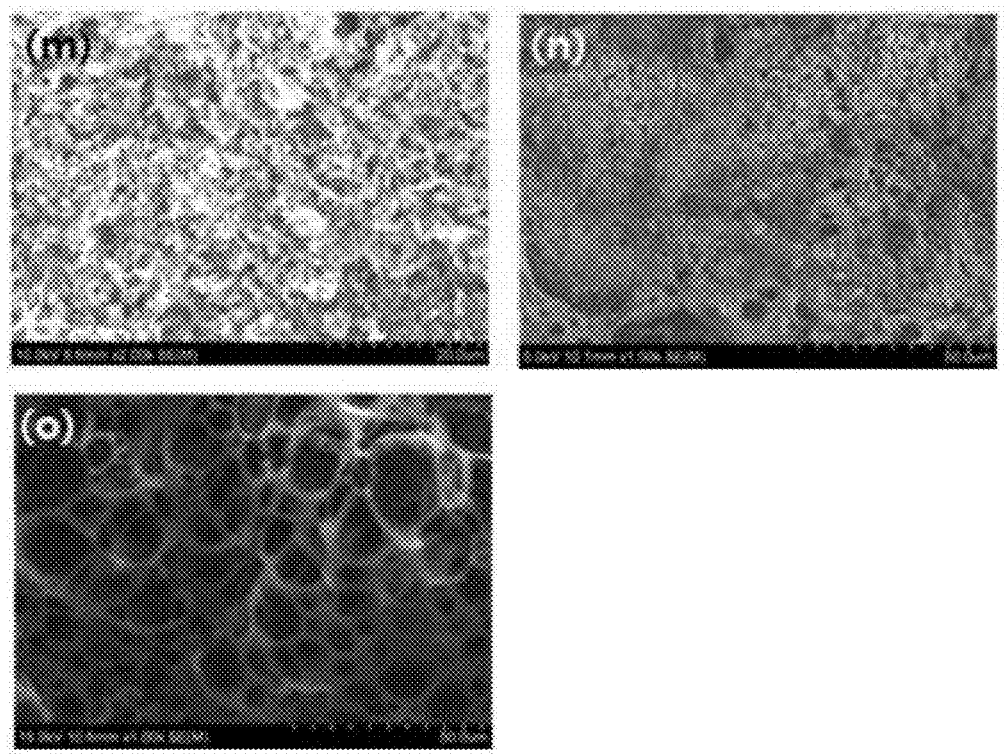
【Figure 8】
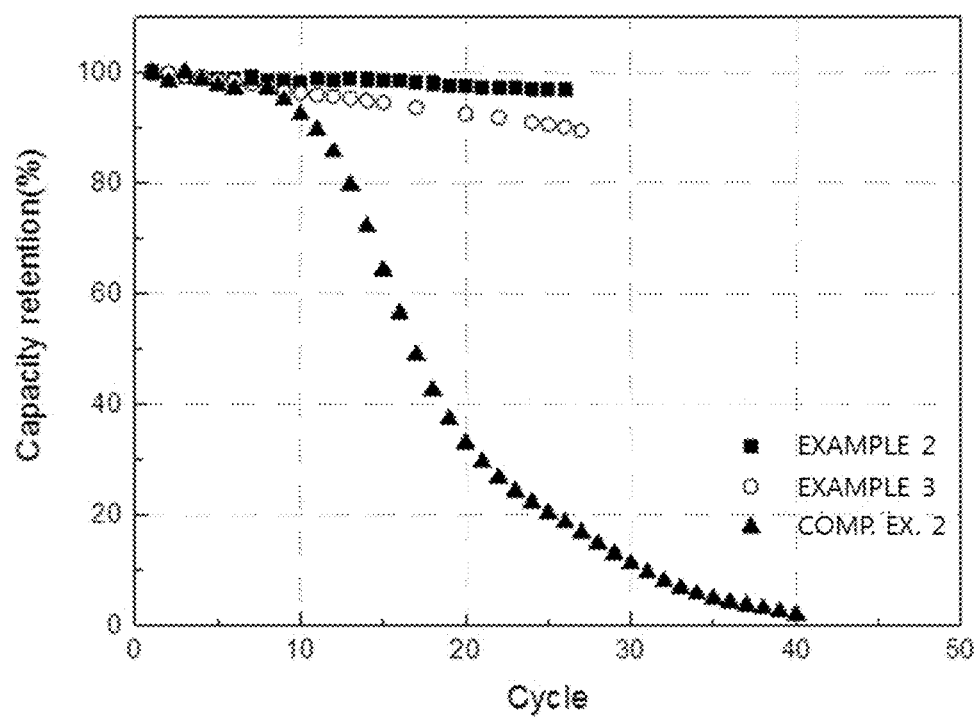

ANODE COMPRISING MULTIPLE PROTECTIVE LAYERS, AND LITHIUM SECONDARY BATTERY COMPRISING SAME

TECHNICAL FIELD

This application claims the benefit of priority based on Korean Patent Application No. 10-2016-0105197, filed with the Korean Intellectual Property Office on Aug. 19, 2016, the entire contents of which are incorporated herein by reference.

The present invention relates to a negative electrode including a multi-protective layer and a lithium secondary battery including the same, and in particular, to a negative electrode including a multi-protective layer capable of effectively suppressing dendrite growth, preventing battery performance decline and securing stability when operating a battery, and a lithium secondary battery including the same.

BACKGROUND ART

Interests in energy storage technologies have been increasingly higher recently. As applications are expanded to energy of mobile phones, camcorders and notebook PCs, and furthermore, to electric vehicles, efforts on the research and development of electrochemical devices have been more and more materialized.

Electrochemical devices are fields receiving most attentions in such aspects and among these, development of secondary batteries capable of charge and discharge have been the focus of attention, and in developing such batteries, research and development on the design of new electrodes and batteries for enhancing capacity density and energy efficiency have been recently progressed.

Among currently used secondary batteries, lithium secondary batteries developed in early 1990s have received attentions with advantages of having high operating voltage and significantly higher energy density compared to conventional batteries such as Ni-MH, Ni—Cd and sulfuric acid-lead batteries using an aqueous liquid electrolyte.

A lithium secondary battery has a structure of an electrode assembly including a positive electrode, a negative electrode and a separator interposed between the positive electrode and the negative electrode being laminated or wound, and is formed by embedding the electrode assembly in a battery case, and injecting a non-aqueous liquid electrolyte thereinto. The lithium secondary battery produces electric energy through oxidation and reduction reactions occurring when lithium ions are intercalated/deintercalated in the positive electrode and the negative electrode.

In a common lithium secondary battery, a negative electrode uses lithium metal, carbon and the like as an active material, and a positive electrode uses lithium oxides, transition metal oxides, metal chalcogen compounds, conductive polymers and the like as an active material.

Among these, a lithium secondary battery using lithium metal as a negative electrode mostly attaches lithium foil on a copper current collector, or uses a lithium metal sheet itself as an electrode. Lithium metal has low potential and high capacity, and has received much attention as a high capacity negative electrode material.

When using lithium metal as a negative electrode, electron density non-uniformization may occur on the lithium metal surface when operating a battery due to various reasons. As a result, a branch-shaped lithium dendrite is produced on the electrode surface causing formation and growth of projections on the electrode surface, which makes the electrode surface very rough. Such lithium dendrite causes, together with battery performance decline, separator damages and battery short circuits in severe cases. As a result, a temperature in the battery increases causing a risk of battery explosion and fire.

In order to resolve such problems, researches such as introducing a polymer protective layer or an inorganic solid protective layer to a lithium metal layer, increasing a concentration of a salt of a liquid electrolyte, or using proper additives have been urgently required.

PRIOR ART DOCUMENTS (Patent Document 1) Korean Patent No. 10-1486130 "lithium metal electrode modified by conductive polymer, method for preparing the same and lithium metal battery using the same"

(Patent Document 2) Korean Patent Application Laid-Open Publication No. 10-2002-0057577 "Negative electrode for lithium battery and lithium battery including the same"

DISCLOSURE

Technical Problem

As described above, lithium dendrite of a lithium secondary battery is precipitated on a negative electrode surface and sometimes causes cell volume expansion therefrom. As a result of extensive studies in view of the above, the inventors of the present invention have found out a way to resolve such a problem caused by dendrite through electrode structure modification, and have completed the present invention.

Accordingly, an aspect of the present invention provides a lithium secondary battery resolving a problem of cell volume expansion caused by lithium dendrite through electrode structure modification, and having enhanced battery performance.

Technical Solution

According to an aspect of the present invention, there is provided a negative electrode for a lithium secondary battery including a lithium metal layer; and a multilayer-structured protective layer formed on the lithium metal layer, wherein the protective layer includes a first protective layer including a composite material of carbon nanotube-ion conductive polymer; and a second protective layer including a composite material of carbon nanotube-electrically conductive polymer.

Herein, the protective layer may have two or more layers in which the first protective layer and the second protective layer are alternately laminated.

Herein, the first protective layer may have a thickness of 0.01 μm to 10 μm.

Herein, the second protective layer may have a thickness of 0.01 μm to 10 μm.

Herein, the composite material of carbon nanotube-ion conductive polymer may include the carbon nanotubes in 0.5 parts to 20 parts by weight based on 100 parts by weight of the ion conductive polymer.

Herein, the ion conductive polymer may include one or more selected from the group consisting of polyethylene oxide, polyethylene glycol, polypropylene glycol, polypropylene oxide, polyethylene succinate, polyethylene adipate, polyethyleneimine, polyepichlorohydrin, polyβ-propiolactone, polyN-propylaziridine, polyethylene glycol diacrylate, polypropylene glycol diacrylate, polyethylene glycol dimethacrylate and polypropylene glycol dimethacrylate.

Herein, the composite material of carbon nanotube-electrically conductive polymer may include the carbon nanotubes in 0.5 parts to 20 parts by weight based on 100 parts by weight of the electrically conductive polymer.

Herein, the electrically conductive polymer may include one or more selected from the group consisting of polyaniline, polyethylenedioxythiophene, polyphenylene vinylene, polyacetylene, poly(p-phenylene), polythiophene, poly(3-alkylthiophene), poly(3-alkoxythiophene), poly(crown ether thiophene), polypyrrole, poly(dialkyl-2,2'-bipyridine), polypyridine, polyalkylpyridine, poly(2,2'-bipyridine), poly(dialkyl-2,2'-bipyridine), polypyrimidine, polydihydrophenanthrene, polyquinoline, polyisoquinoline, poly(1,2,3-benzothiadiazole), poly(benzimidazole), poly(quinoxaline), poly(2,3-diarylquinoxaline), poly(1,5-naphthyridine), poly(1,3-cyclohexadiene), poly(anthraquinone), poly(Z-methyl-anthraquinone), poly(ferrocene), poly(6,6'-biquinoline), polyphenylene sulfide, polyphenylene vinylene, polyindole, polypyrene, polycarbazole, polyazulene, polyazepine, polyfluorene, polynaphthalene and poly3,4-ethylenedioxythiophene-polystyrene sulfonate.

According to another aspect of the present invention, there is provided a negative electrode for a lithium secondary battery including a lithium metal layer; a temporary protective layer formed on the lithium metal layer; and a multilayer-structured protective layer formed on the temporary protective layer, wherein the temporary protective metal may form an alloy with the lithium metal or may be diffused into the lithium metal, and the protective layer includes a first protective layer including a composite material of carbon nanotube-ion conductive polymer; and a second protective layer including a composite material of carbon nanotube-electrically conductive polymer.

Herein, the temporary protective metal may include one or more selected from the group consisting of copper, magnesium, aluminum, silver, gold, lead, cadmium, bismuth, indium, germanium, gallium, zinc, tin and platinum.

According to another aspect of the present invention, there is provided a lithium secondary battery including the negative electrode.

Advantageous Effects

A multi-protective layer according to the present invention prevents lithium dendrite growth on an electrode surface, and does not cause overpotential during charge and discharge since the protective layer itself does not function as a resistive layer, and therefore, is capable of preventing battery performance decline and securing stability when operating a battery.

Accordingly, a lithium electrode including the multi-protective layer provided in the present invention can be preferably used as a negative electrode of a lithium secondary battery, and this can be used in various devices, for example, from most small electronic devices to large capacity energy storage equipment using lithium metal as a negative electrode.

DESCRIPTION OF DRAWINGS

FIG. 1 is a mimetic diagram of a negative electrode for a lithium secondary battery according to one embodiment of the present invention.

FIG. 2 is a mimetic diagram of a negative electrode for a lithium secondary battery according to one embodiment of the present invention.

FIG. 3 is a mimetic diagram of a negative electrode for a lithium secondary battery according to one embodiment of the present invention.

FIG. 4 shows SEM images of lithium metals prepared in (a) Example 1, (b) Example 2, (c) Example 3 and (d) Example 4.

FIG. 5 shows SEM images of lithium metals prepared in (e) Example 5, (f) Example 6, (g) Example 7 and (h) Example 8.

FIG. 6 shows SEM images of lithium metals prepared in (i) Comparative Example 1, (j) Comparative Example 2, (k) Comparative Example 3 and (l) Comparative Example 4.

FIG. 7 shows SEM images of lithium metals prepared in (m) Comparative Example 5, (n) Comparative Example 6 and (o) Comparative Example 7.

FIG. 8 shows charge and discharge test results on negative electrodes prepared in Examples 2 and 3 and Comparative Example 2.

BEST MODE

Hereinafter, the present invention will be described in detail so that those skilled in the art may readily implement the present invention. However, the present invention may be implemented in various different forms, and is not limited to the present specification.

In the present specification, when a layer is described to be "on" another layer or a substrate, this may mean that the layer may be directly formed on another layer or a substrate, or a third layer may be provided therebetween. In addition, directional expressions such as up, above (upper) or an upper surface may be construed as meanings such as down, below (lower) or a lower surface based on the standard. In other words, spatial directional expressions need to be construed as relative directions and are not to be limitedly construed as meaning absolute directions.

In addition, terms such as "include", "contain" or "have" are to specify the presence of features, numbers, constituents or combinations thereof described in the specification, and need to be construed as not excluding the possibility of presence or addition of one or more of other features, numbers, constituents or combinations thereof.

In the drawings, thicknesses of layers and areas may be exaggerated or skipped for clarity. Like reference numerals designate like constituents throughout the specification.

In addition, when detailed descriptions on related known functions or constitutions are considered to unnecessarily cloud the gist of the present invention in describing the present invention below, the detailed descriptions will not be included.

One embodiment of the present invention provides a negative electrode (100) for a lithium secondary battery including a lithium metal layer (110); and a multilayer-structured protective layer formed on the lithium metal layer (110), wherein the protective layer includes a first protective layer (120) including a composite material of carbon nanotube-ion conductive polymer; and a second protective layer (130) including a composite material of carbon nanotube-electrically conductive polymer.

When using lithium metal as a battery negative electrode, problems as above are generally present. First, lithium explosively reacts with water as an alkali metal and therefore is difficult to prepare and use under general environments. Second, when using lithium as a negative electrode, the lithium reacts with an electrolyte, water, impurities in the battery, lithium salts and the like to produce a passive layer, and this layer causes a local current density difference forming dendritic lithium dendrite. In addition, the dendrite formed as above grows, passes between voids of a separator and may produce a direct internal short circuit with a positive electrode causing battery explosion. Third, lithium is a soft metal and has weak mechanical strength, and its handling property is very poor to use without additional surface treatment.

In view of the above, by forming a first protective layer (120) including a composite material of carbon nanotube-ion conductive polymer and a second protective layer (130) including a composite material of carbon nanotube-electrically conductive polymer on a lithium metal layer (110) the present invention is capable of preventing dendrite growth.

FIGS. 1 and 2 are diagrams each showing a negative electrode (100) for a lithium secondary battery according to one embodiment of the present invention.

In the negative electrode (100) for a lithium secondary battery of FIG. 1, a first protective layer (120) including a composite material of carbon nanotube-ion conductive polymer and a second protective layer (130) including a composite material of carbon nanotube-electrically conductive polymer are consecutively alternately laminated on a lithium metal layer (110), and in the negative electrode (100) for a lithium secondary battery of FIG. 2, the two protective layers are laminated in the reverse order. In FIGS. 1 and 2, the first protective layer (120) and the second protective layer (130) are formed only on one surface of the lithium metal layer (110), however, the structure is not limited thereto, and the layers may be formed on both surfaces.

As the lithium metal layer (110), plate-shaped lithium metal may be used, and the width may be adjusted depending on the electrode type so as to readily prepare the electrode.

The center of the tube is empty in the carbon nanotubes, and multi-walled carbon nanotubes having a several to tens of graphite surfaces may be obtained. As one example, single-walled carbon nanotubes, double-walled carbon nanotubes or multi-walled carbon nanotubes may be formed.

The first protective layer (120) including a composite material of carbon nanotube-ion conductive polymer and the second protective layer (130) including a composite material of carbon nanotube-electrically conductive polymer block the lithium metal layer (110) from an electrolyte or moisture in the electrolyte, and perform a role of suppressing dendrite growth.

The two protective layers may be prepared into a polymer solution dispersed into a solvent in order to be coated on the lithium metal layer (110) through a wet process. The polymer or monomer may be mixed with a solvent coating solution, and microgravure coating, comma coating, slot die coating, spray coating, dip coating, flow coating or the like may be employed for the formation, however, the method is not limited thereto.

The protective layer may be prepared by coating a composition on a glass substrate or the like, and curing and separating the result, and then, although not limited thereto, may be attached on the lithium metal layer (110) using an adhesive component such as polydopamine, an olefin-based elastomer, a silicone-based elastomer or an acryl-based elastomer, or may be prepared by directly coating a composition on the lithium metal layer (110) and curing the result.

The protective layer is prepared including carbon nanotubes for enhancing both mechanical strength and electrical conductivity, and including an ion conductive polymer or an electrically conductive polymer for enhancing ion conductivity, electrical conductivity or for weakening resistance, and, in addition to the above-mentioned constitution, may additionally include materials capable of enhancing effects of the protective layer. By laminating both the protective layer including a composite material of an ion conductive polymer and the protective layer including a composite material of an electrically conductive polymer as above, effects of enhancing both ion conductivity and electrical conductivity of the protective layer may be obtained.

The first protective layer (120) may have a thickness of 0.01 µm to 10 µm.

When the first protective layer (120) has a thickness smaller than the above-mentioned range, functions as a protective layer may be difficult to obtain, and when the thickness is larger than the above-mentioned range, interfacial resistance increases causing battery property decline.

The second protective layer (130) may have a thickness of 0.01 µm to 10 µm.

When the second protective layer (130) has a thickness smaller than the above-mentioned range, functions as a protective layer may be difficult to obtain, and when the thickness is larger than the above-mentioned range, interfacial resistance increases causing battery property decline.

The composite material of carbon nanotube-ion conductive polymer means a composite material including carbon nanotubes and an ion conductive polymer, and in addition thereto, may further include materials required for preparation or additional materials capable of enhancing properties.

The ion conductive polymer may have a plurality of electron-donating atoms or atomic groups capable of forming coordinate bonds with lithium ions in the polymer chain, and may mean a polymer capable of migrating lithium ions among coordinate bonding locations due to local movements of the polymer chain segment.

The composite material of carbon nanotube-ion conductive polymer may include the carbon nanotubes in 0.5 parts to 20 parts by weight based on 100 parts by weight of the ion conductive polymer.

When the carbon nanotubes are included too much compared to the above-mentioned range, ion conductivity may decrease, and when the carbon nanotubes are included too little, mechanical strength of the protective layer may decrease.

The ion conductive polymer may include one or more selected from the group consisting of polyethylene oxide, polyethylene glycol, polypropylene glycol, polypropylene oxide, polyethylene succinate, polyethylene adipate, polyethyleneimine, polyepichlorohydrin, polyβ-propiolactone, polyN-propylaziridine, polyethylene glycol diacrylate, polypropylene glycol diacrylate, polyethylene glycol dimethacrylate and polypropylene glycol dimethacrylate.

The ion conductive polymer may have a weight average molecular weight of 1,000,000 to 5,000,000. When the molecular weight is less than the above-mentioned range, strength is weak as a polymer protective layer, which may cause concern of being dissolved when in contact with a liquid electrolyte, and when the molecular weight is greater than the above-mentioned range on the contrary, lithium ion migration is suppressed causing battery performance decline, and therefore, the molecular weight is properly selected within the above-mentioned range.

In addition, the ion conductive polymer may further include a lithium salt.

A polymer layer in which a highly concentrated lithium salt is dissociated is used, and therefore, the polymer layer does not function as a resistive layer due to high ion conductivity, and since overpotential is not applied during charge and discharge, battery performance decline is prevented, which is more advantageous when rapidly charging and discharging a battery.

Herein, any material used as a lithium salt in a battery field may be used as the lithium salt, and typical examples thereof may include one or more selected from the group consisting of LiCl, LiBr, LiI, LiClO$_4$, LiBF$_4$, LiB$_{10}$Cl$_{10}$, LiPF$_6$, LiAsF$_6$, LiSbF$_6$, LiAlCl$_4$, LiSCN, Li(FSO$_2$)$_2$N, LiCF$_3$CO$_2$, LiCH$_3$SO$_3$, LiCF$_3$SO$_3$, LiN(SO$_2$CF$_3$)$_2$, LiN(SO$_2$C$_2$F$_5$)$_2$, LiC$_4$F$_9$SO$_3$, LiC(CF$_3$SO$_2$)$_3$, (CF$_3$SO$_2$)$_2$NLi, chloroborane lithium, lower aliphatic carboxylic acid lithium, lithium tetraphenylborate imide and combinations thereof, and preferably, Li(FSO$_2$)$_2$N may be used. The lithium salt has different ion conductivity depending on the type, and ion mobility may become strong or weak with an interaction between lithium ions and a polymer chain, and when using both PEO and Li(FSO$_2$)$_2$N, optimal effects may be obtained.

In addition, the ion conductive polymer forms an ion crosslinking network structure as necessary. The crosslinking network structure increases strength of the polymer protective layer, and herein, lithium dendrite generation on the electrode surface may be physically suppressed as the strength increases, and polymer layer dissolution and the like may be more effectively prevented by a liquid electrolyte penetrating into the polymer layer. However, when the strength increases too much, the polymer protective layer becomes harder and is readily broken, which causes a problem of damaging the polymer protective layer due to volume changes on a lithium negative electrode surface during charge/discharge. Accordingly, in the present invention, polymer having flexibility is used, and specific polymers are selected so that lithium ions smoothly migrate. Such a crosslinking network structure may use a difunctional or higher multifunctional monomer for crosslinking, and preferably uses an alkylene glycol diacrylate monomer.

The composite material of carbon nanotube-electrically conductive polymer is a composite material including carbon nanotubes and an electrically conductive polymer, and in addition thereto, may further include materials required for preparation or additional materials capable of enhancing properties.

The electrically conductive polymer may be a polymer having a conjugated structure in which carbon-carbon single bonds and double bonds are alternately repeated, or having a conjugated structure coupled with heteroatoms providing p-orbitals, and may mean a conducting and semiconducting organic material having an extended n-conjugation system on the main chain. The electrically conductive polymer may be doped to have a charge carrier using various methods such as chemical doping, electrochemical doping, photodoping, charge injection doping, and non-oxidation and reduction doping.

The composite material of carbon nanotube-electrically conductive polymer may include the carbon nanotubes in 0.5 parts to 20 parts by weight based on 100 parts by weight of the electrically conductive polymer. When the carbon nanotubes are included too much compared to the above-mentioned range, interfacial resistance may increase, and when the carbon nanotubes are included too little, mechanical strength of the protective layer may decrease.

The electrically conductive polymer may include one or more selected from the group consisting of polyaniline, polyethylenedioxythiophene, polyphenylene vinylene, polyacetylene, poly(p-phenylene), polythiophene, poly(3-alkylthiophene), poly(3-alkoxythiophene), poly(crown ether thiophene), polypyrrole, poly(dialkyl-2,2'-bipyridine), polypyridine, polyalkylpyridine, poly(2,2'-bipyridine), poly(dialkyl-2,2'-bipyridine), polypyrimidine, polydihydrophenanthrene, polyquinoline, polyisoquinoline, poly(1,2,3-benzothiadiazole), poly(benzimidazole), poly(quinoxaline), poly(2,3-diarylquinoxaline), poly(1,5-naphthyridine), poly(1,3-cyclohexadiene), poly(anthraquinone), poly(Z-methyl-anthraquinone), poly(ferrocene), poly(6,6'-biquinoline), polyphenylene sulfide, polyphenylene vinylene, polyindole, polypyrene. polycarbazole, polyazulene, polyazepine, polyfluorene, polynaphthalene and poly3,4-ethylenedioxythiophene-polystyrene sulfonate.

The electrically conductive polymer may have a weight average molecular weight of 1,000,000 to 5,000,000. When the molecular weight is less than the above-mentioned range, strength is weak as a polymer protective layer, which may cause concern of being dissolved when in contact with a liquid electrolyte, and when the molecular weight is greater than the above-mentioned range on the contrary, lithium ion migration is suppressed causing battery performance decline, and therefore, the molecular weight is properly selected within the above-mentioned range.

The protective layer according to the present invention may be formed by laminating two or more of the first protective layer (120) and the second protective layer (130), and these may be laminated in order of the first protective layer (120)/the second protective layer (130), or the second protective layer (130)/the first protective layer (120) on the lithium metal layer (110), or may be staggeredly alternately laminated. In other words, the protective layer may have a constitution of a minimum of two layers or more, and a maximum of 10 layers or less. The thickness of the polymer protective layer having the composition is not limited in the present invention, and is in a range that does not increase internal resistance of a battery while securing the above-mentioned effects, and for example, may be from 2 μm to 50 μm. When the thickness is less than the above-mentioned range, functions as a protective layer may not be obtained, and when the thickness is greater than the above-mentioned range on the contrary, a stable interfacial property may be provided, however, initial interfacial resistance increases causing an increase in the internal resistance when manufacturing a battery.

The negative electrode (100) for a lithium secondary battery according to the present invention may have various widths and lengths depending on the shape processed to a battery. As necessary, the negative electrode (100) for a lithium secondary battery prepared to have various widths may be wound and cut to be used.

In addition, the present invention provides a negative electrode (100) for a lithium secondary battery including a lithium metal layer (110); a temporary protective layer (140) formed on the lithium metal layer (110); and a multilayer-structured protective layer formed on the temporary protective layer (140), wherein the temporary protective metal may form an alloy with the lithium metal or may be diffused into the lithium metal, and the protective layer includes a first protective layer (120) including a composite material of carbon nanotube-ion conductive polymer; and a second protective layer (130) including a composite material of carbon nanotube-electrically conductive polymer.

The temporary protective metal may include one or more selected from the group consisting of copper, magnesium, aluminum, silver, gold, lead, cadmium, bismuth, indium, germanium, gallium, zinc, tin and platinum.

During an electrochemical cycle of a battery including the negative electrode of the present invention, the temporary protective layer (140) forms an alloy with the lithium metal layer (110), is dissolved therein, is blended therewith, or is diffused thereinto to obtain a negative electrode active layer including lithium metal. Lithium metal is known to form alloys with specific metals, and in addition, is observed to, for example, be alloyed with a thin film of specific other metals such as copper, or diffused thereinto. In one embodiment of the present invention, the metal of the temporary protective layer (140) forms an alloy with the lithium metal layer (110). In one embodiment of the present invention, the metal of the temporary protective layer (140) is diffused into the lithium metal. Mutual diffusion or alloy formation may be assisted by heating a negative electrode assembly.

The temporary protective layer (140) may enhance battery properties by going through changes such as forming an alloy with the lithium metal layer (110) when charging and discharging a battery, and by the two protective layers suppressing dendrite formation and the like, battery efficiency may be maximized.

FIG. 3 is a diagram showing a negative electrode (100) for a lithium secondary battery according to one embodiment of the present invention.

In the negative electrode (100) for a lithium secondary battery of FIG. 3, a temporary protective layer (140) is laminated on a lithium metal layer (110), and a first protective layer (120) including a composite material of carbon nanotube-ion conductive polymer and a second protective layer (130) including a composite material of carbon nanotube-electrically conductive polymer are consecutively alternately laminated thereon. According to one embodiment of the present invention, the second protective layer (130) is laminated on the temporary protective layer (140), and the first protective layer (120) may be laminated thereon.

In addition, the present invention provides a lithium secondary battery including the negative electrode.

In the lithium secondary battery according to the present invention, constitutions other than structures and characteristics of the negative electrode described above may be prepared through known technologies by those skilled in the art, and hereinafter, specific descriptions will be provided.

A general lithium secondary battery includes a negative electrode; a positive electrode; a separator interposed therebetween; and an electrolyte, and the negative electrode of a lithium secondary battery of the present invention may include a negative electrode including the multi-protective layer of the present invention.

The positive electrode may be prepared into a positive electrode form by filming a composition including a positive electrode active material, a conductor and a binder on a positive electrode current collector.

As the positive electrode active material, any one selected from the group consisting of $LiCoO_2$, $LiNiO_2$, $LiMnO_2$, $LiMn_2O_4$, $Li(Ni_aCo_bMn_c)O_2$ ($0<a<1$, $0<b<1$, $0<c<1$, $a+b+c=1$), $LiNi_{1-y}Co_yO_2$, $LiCo_{1-y}Mn_yO_2$, $LiNi_{1-y}Mn_yO_2$ ($0 \leq y<1$), $Li(Ni_aCo_bMn_c)O_4$ ($0<a<2$, $0<b<2$, $0<c<2$, $a+b+c=2$), $LiMn_{2-z}Ni_zO_4$, $LiMn_{2-z}Co_zO_4$ ($0<z<2$), $LiCoPO_4$ and $LiFePO_4$, or a mixture of two or more types thereof may be used. In addition, sulfides, selenides, halides and the like may also be used in addition to such oxides. In more preferred examples, the positive electrode active material may be $LiCoO_2$ suited for high output batteries.

The conductor is a component for further enhancing conductivity of a positive electrode active material, and nonlimiting examples thereof may include graphite such as natural graphite or artificial graphite; carbon black such as carbon black, acetylene black, ketjen black, channel black, furnace black, lamp black and thermal black; conductive polymers such as carbon fibers or metal fibers; metal powders such as fluorocarbon, aluminum and nickel powder; conductive whiskers such as zinc oxide and potassium titanate; conductive metal oxides such as titanium oxide; conductive materials such as polyphenylene derivatives, and the like.

The binder has functions of keeping a positive electrode active material on a positive electrode current collector, and organically linking the positive electrode active materials, and examples thereof may include polyvinylidene fluoride (PVDF), polyvinyl alcohol (PVA), carboxymethylcellulose (CMC), starch, hydroxypropylcellulose, regenerated cellulose, polyvinyl pyrrolidone, tetrafluoroethylene, polyethylene, polypropylene, an ethylene-propylene-diene polymer (EPDM), a sulfonated-EPDM, styrene-butadiene rubber, fluoro rubber, various copolymers thereof, and the like.

The positive electrode current collector is the same as described in the negative electrode current collector, and an aluminum thin plate may be generally used as the positive electrode current collector.

The positive electrode composition may be coated on the positive electrode current collector using common methods known in the art, and for example, various methods such as a dipping method, a spray method, a roll coating method, a gravure printing method, a bar coating method, a die coating method, a comma coating method or a mixed method thereof may be used.

The positive electrode and the positive electrode composition that have gone through such a coating process go through solvent or dispersion medium evaporation, compactness of the coating layer and adhesion between the coating layer and the current collector using a drying process. Herein, the drying is carried out using a common method, and is not particularly limited.

The separator is not particularly limited in the material and, as a material physically separating a positive electrode and a negative electrode and having electrolyte and ion penetrability, those commonly used as a separator in an electrochemical device may be used without particular limit. However, as a material that is porous, nonconductive and insulating, those having an excellent liquid electrolyte moisture-containing ability while having low resistance for ion migration of the liquid electrolyte are particularly preferred. For example, a polyolefin-based porous membrane or non-woven fabric may be used, however, the separator is not particularly limited thereto.

As examples of the polyolefin-based porous membrane, membranes formed with a polymer using a polyolefin-based polymer such as polyethylene such as high density polyethylene, linear low density polyethylene, low density polyethylene and ultra-high molecular weight polyethylene, polypropylene, polybutylene and polypentene alone, or formed with a polymer mixing these may be used.

As the non-woven fabric other than the polyolefin-based non-woven fabric described above, non-woven fabric formed with a polymer using, for example, polyphenylene oxide, polyimide, polyamide, polycarbonate, polyethylene terephthalate, polyethylene naphthalate, polybutylene terephthalate, polyphenylene sulfide, polyacetal, polyether sulfone, polyetheretherketone, polyester and the like alone, or formed with a polymer mixing these may be used, and, as a fiber form forming a porous web, such non-woven fabric includes a spunbond or meltblown form formed with long fibers.

The thickness of the separator is not particularly limited, but is preferably in a range of 1 μm to 100 μm, and more preferably in a range of 5 μm to 50 μm. When the separator has a thickness of less than 1 μm, mechanical properties may not be maintained, and when the thickness is greater than 100 μm, the separator functions as a resistive layer declining battery performance.

A pore size and porosity of the separator are not particularly limited, however, the pore size is preferably from 0.1 μm to 50 μm, and the porosity is preferably from 10% to 95%. When the separator has a pore size of less than 0.1 μm or porosity of less than 10%, the separator functions as a resistive layer, and when the pore size is greater than 50 μm or the porosity is greater than 95%, mechanical properties may not be maintained.

The electrolyte may be a non-aqueous liquid electrolyte or a solid electrolyte not reacting with lithium metal, but is preferably a non-aqueous electrolyte, and includes an electrolyte salt and an organic solvent.

The electrolyte salt included in the non-aqueous liquid electrolyte is a lithium salt. As the lithium salt, those commonly used in liquid electrolytes for a lithium secondary battery may be used without limit. For example, an anion of the lithium salt may include any one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$, or two or more types thereof.

As the organic solvent included in the non-aqueous liquid electrolyte, those commonly used in liquid electrolytes for a lithium secondary battery may be used without limit, and for example, ether, ester, amide, linear carbonate, cyclic carbonate and the like may be used either alone, or as a mixture of two or more types. Among these, a carbonate compound that is cyclic carbonate, linear carbonate or a mixture thereof may be typically included.

Specific examples of the cyclic carbonate compound may include any one selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, vinyl ethylene carbonate and halides thereof, or a mixture of two or more types thereof. Examples of the halides thereof may include fluoroethylene carbonate (FEC) and the like, but are not limited thereto.

Specific examples of the linear carbonate compound may typically include any one selected from the group consisting of dimethyl carbonate (DMC), diethyl carbonate (DEC), dipropyl carbonate, ethylmethyl carbonate (EMC), methylpropyl carbonate and ethylpropyl carbonate, or a mixture of two or more types thereof, but are not limited thereto.

Particularly, among the carbonate-based organic solvents, ethylene carbonate and propylene carbonate that are cyclic carbonate are a highly viscous organic solvent and have a high dielectric constant, and therefore, may more favorably dissociate a lithium salt in an electrolyte, and when mixing and using linear carbonate having low viscosity and low dielectric constant such as dimethyl carbonate and diethyl carbonate in a proper ratio to such cyclic carbonate, a liquid electrolyte having higher electrical conductivity may be prepared.

In addition, as the ether among the organic solvents, any one selected from the group consisting of dimethyl ether, diethyl ether, dipropyl ether, methylethyl ether, methylpropyl ether and ethylpropyl ether, or a mixture of two or more types thereof may be used, however, the ether is not limited thereto.

As the ester among the organic solvents, a mixture of one or more selected from the group consisting of methyl acetate, ethyl acetate, propyl acetate, methyl propionate, ethyl propionate, propyl propionate, γ-butyrolactone, γ-valerolactone, γ-caprolactone, σ-valerolactone and ε-caprolactone may be used, however, the ester is not limited thereto.

The non-aqueous liquid electrolyte may be injected at a proper stage in an electrochemical device manufacturing process depending on manufacturing process and required properties of a final product. In other words, the non-aqueous liquid electrolyte may be injected at a stage prior to assembling an electrochemical device or at a final stage of electrochemical device assembly.

The lithium secondary battery according to the present invention may go through lamination (stack) and folding processes of a separator and an electrode in addition to winding, a general process. In addition, the battery case may be cylindrical, square, a pouch-type, a coin-type or the like.

As described above, the lithium secondary battery according to the present disclosure stably exhibits excellent discharge capacity, output property and capacity retention rate, and therefore, is useful in the fields of portable devices such as mobile phones, notebook computers or digital cameras, electric vehicles such as hybrid electric vehicles (HEV), and the like.

Hereinafter, preferred examples and experimental examples are provided in order to illuminate the present invention. However, the following examples and experimental examples are for illuminating the present invention, and the present invention is not limited to the following examples and experimental examples.

<Example and Comparative Example> Preparation of Negative Electrode for Lithium Secondary Battery and Manufacture of Battery Including the Same Examples 1 to 8. Preparation of Negative Electrode for Lithium Secondary Battery of the Present Invention (Double Layer)

A polyaniline (PANI) monomer and carbon nanotubes (CNT) were dissolved in an NMP solution in a content as listed in the following Table 1, and the result was uniformly dispersed using ultrasonic dispersion. In addition, a solution dissolving carbon nanotubes and polyethylene oxide (PEO) in a content as listed in the following Table 1 was uniformly mixed with an acetonitrile solution using ultrasonic dispersion, and after introducing a liquid electrolyte in a weight twice than the polymer weight, the result was stirred for 2 hours. The two polymer solutions were coated on a lithium metal surface in consecutive order using a spin coater, and herein, the process was carried out in a dry room at room temperature in order to minimize influences caused by moisture and active gases in the atmosphere. After dropping a small amount of the polymer solutions on the lithium metal surface, continuous coating was carried out for 10 seconds at a rate of 2000 rpm and then for 20 seconds at a rate of 2500 rpm. Then, the NMP and the acetonitrile solvents were removed, and in order to increase adhesion between the lithium metal and the protective layers formed thereon, the result was dried for 1 minute to 2 minutes in a vacuum oven at 110° C., and as a result, two protective layers were formed. Each of the protective layers was prepared to have a thickness of 10 μm.

TABLE 1

| Mixture | First Layer | | Second Layer | |
|---|---|---|---|---|
| | PANI (g) | CNT (g) | PEO (g) | CNT (g) |
| Example 1 | 100 | 0.5 | 100 | 0.5 |
| Example 2 | | 1 | | 1 |
| Example 3 | | 5 | | 5 |
| Example 4 | | 10 | | 10 |
| Example 5 | | 10 | | 0.5 |
| Example 6 | | 5 | | 1 |
| Example 7 | | 1 | | 5 |
| Example 8 | | 0.5 | | 10 |

Comparative Examples 1 to 4. Preparation of Comparative Negative Electrode for Lithium Secondary Battery (Double Layer)

Protective layers were formed by preparing a negative electrode in the same manner as in Examples 1 to 8 using a composition of the following Table 2, except that a polyvinylidene fluoride-hexafluoropropylene (PVdF-HFP) copolymer was used instead of PEO.

TABLE 2

| Mixture | First Layer | | Second Layer | | Liquid Electrolyte (g) |
|---|---|---|---|---|---|
| | PANI (g) | CNT (g) | PVDP-HFP (g) | CNT (g) | |
| Comparative Example 1 | 100 | 0.5 | 100 | 0.5 | 200 |
| Comparative Example 2 | | 1 | | | |
| Comparative Example 3 | | 5 | | | |
| Comparative Example 4 | | 10 | | | |

Comparative Examples 5 to 7. Preparation of Comparative Negative Electrode for Lithium Secondary Battery (Single Layer)

A single protective layer was formed by preparing a negative electrode in the same manner as in Examples 1 to 8, except that a mixture shown in the following Table 3 was used instead of the solution dissolving CNT and PANI or PEO.

TABLE 3

| Mixture | PEO (g) | PANI (g) | CNT (g) | Liquid Electrolyte (g) |
|---|---|---|---|---|
| Comparative Example 5 | 100 | 0 | 0 | 200 |
| Comparative Example 6 | 0 | 100 | 0 | |
| Comparative Example 7 | 50 | 50 | 5 | |

3. Manufacture of Lithium Secondary Battery

A lithium metal battery was prepared using each of the negative electrode for a lithium secondary battery of Examples 1 to 8 and Comparative Examples 1 to 7, an organic liquid electrolyte, and a $LiCoO_2$ positive electrode. In order to prepare the positive electrode, poly(vinylidene fluoride) (PVdF) used as a binder was dissolved in N-methyl pyrrolidone, and then Super-P carbon, a conductor, and $LiCoO_2$ were weighted and introduced to this mixture solution, and the result was stirred. Herein, a weight ratio of the positive electrode active material, the conductor and the binder was 85:7.5:7.5. A completely mixed slurry solution was coated on an aluminum current collector, the result was dried, and a lamination process was carried out using a roll press. This is for enhancing mutual binding force between the active material/conductor/binder, and for effectively binding these materials on the current collector. After the pressing process, a proper-sized electrode was prepared through a cutting process, and the electrode was dried for 24 hours or longer in a vacuum oven at 110° C. As the negative electrode, the lithium metal layer with each of the protective layers of Examples 1 to 8 and Comparative Examples 1 to 7 formed thereon was laminated on copper foil and used. As a separator, Celgard 3501 was used. All the electrode preparations were carried out in a dry room, and the battery was manufactured in an argon atmosphere-maintained glove box.

<Experimental Example> Evaluation on Lithium Secondary Battery

1. Surface Property Evaluation

After manufacturing the lithium secondary batteries including the negative electrodes prepared in Examples 1 to 8 and Comparative Examples 1 to 7, the batteries were charged and discharged 10 times under a 0.5 mA condition.

Then, in order to identify lithium dendrite formation, lithium metal (negative electrode) was separated from the batteries.

FIG. 4 shows SEM images of lithium metals prepared in (a) Example 1, (b) Example 2, (c) Example 3 and (d) Example 4, FIG. 5 in (e) Example 5, (f) Example 6, (g) Example 7 and (h) Example 8, FIG. 6 in (i) Comparative Example 1, (j) Comparative Example 2, (k) Comparative Example 3 and (l) Comparative Example 4, and FIG. 7 in (m) Comparative Example 5, (n) Comparative Example 6 and (o) Comparative Example 7.

As shown in FIGS. 4 to 7, in the lithium metals of Examples 1 to 3 and Example 6 in which protective layers were formed according to the present invention, the surfaces were observed to have a very smooth form, whereas, in Comparative Examples 5 to 7 using a single protective layer, dendrite having large voids was formed since conductivity of the lithium metal surface was not uniform.

2. Interfacial Resistance Analysis

Interfacial resistance of the lithium metal negative electrodes with the protective layers of Examples 1 to 8 or Comparative Examples 1 to 7 formed therein was measured, and the results are shown in the following Table 4.

TABLE 4

|  | Initial Interfacial Resistance ($\Omega/cm^2$) | Interfacial Resistance after 10 Days ($\Omega/cm^2$) | Rate of Increase (%) |
| --- | --- | --- | --- |
| Example 1 | 22.47 | 23.37 | 4.01 |
| Example 2 | 8.16 | 8.83 | 8.21 |
| Example 3 | 5.14 | 12.74 | 147.86 |
| Example 4 | 35.17 | 40.22 | 14.36 |
| Example 5 | 34.48 | 41.16 | 19.37 |
| Example 6 | 17.75 | 19.73 | 11.15 |
| Example 7 | 38.37 | 41.95 | 9.33 |
| Example 8 | 11.29 | 17.8 | 52.17 |
| Comparative Example 1 | 384.2 | 434.2 | 13.01 |
| Comparative Example 2 | 190.7 | 216.4 | 13.48 |
| Comparative Example 3 | 296.2 | 330.5 | 11.58 |
| Comparative Example 4 | 411.2 | 451.7 | 9.85 |
| Comparative Example 5 | 38.86 | 105.4 | 171.23 |
| Comparative Example 6 | 17.75 | 57.98 | 226.65 |
| Comparative Example 7 | 24.46 | 102.49 | 319.01 |

As shown in Table 4, it was identified that the batteries including the negative electrodes of Examples 1 to 8 exhibited low resistance in general compared to the batteries including the negative electrodes of Comparative Examples 1 to 4. This means that the reaction between the lithium metal and the organic liquid electrolyte was suppressed due to the conductive polymer material coated on the lithium metal, which resultantly suppressed passive layer growth on the lithium electrode. In addition, this means that conductivity was improved more with PEO than with PVDF-HFP on the lithium metal. In Comparative Examples 5 to 7 using only a single protective layer, initial resistance was low, however, as time passed by, interfacial resistance increased making it difficult to use in battery operation. In other words, it was seen that coating with the conductive polymer performed a positive role in lithium negative electrode-electrolyte interface stabilization.

3. Charge and Discharge Evaluation

The lithium secondary batteries including the negative electrodes prepared in Examples 2 and 3 and Comparative Example 2 were charged and discharged 3 times at 0.1 C, and then 0.3 C was applied to perform a charge and discharge test. The results are shown in FIG. 8.

As shown in FIG. 8, Example 2 had more superior charge and discharge efficiency compared to Example 3 having low initial interfacial resistance, which indicated that a proper content of the carbon nanotubes was present. In addition, in the comparative evaluation between PEO and PVDF-HFP, it was identified that PEO had excellent life time efficiency as well as having low resistance. From this result, it was seen that the protective layer according to the present invention had an excellent ion transferring ability as well as having a lithium dendrite suppressing ability.

REFERENCE NUMERAL

100: Negative Electrode for Lithium Secondary Battery
110: Lithium Metal Layer
120: First Protective Layer
130: Second Protective Layer
140: Temporary Protective Layer

The invention claimed is:

1. A negative electrode for a lithium secondary battery comprising:
    a lithium metal layer; and
    a multilayer-structured protective layer formed on the lithium metal layer,
    wherein the protective layer includes a first protective layer including a composite material of carbon nanotube-ion conductive polymer; and a second protective layer including a composite material of carbon nanotube-electrically conductive polymer.

2. The negative electrode for a lithium secondary battery of claim 1, wherein the protective layer has two or more layers in which the first protective layer and the second protective layer are alternately laminated.

3. The negative electrode for a lithium secondary battery of claim 1, wherein the first protective layer has a thickness of 0.01 μm to 10 μm.

4. The negative electrode for a lithium secondary battery of claim 1, wherein the second protective layer has a thickness of 0.01 μm to 10 μm.

5. The negative electrode for a lithium secondary battery of claim 1, wherein the composite material of carbon nanotube-ion conductive polymer includes the carbon nanotubes in 0.5 parts to 20 parts by weight based on 100 parts by weight of the ion conductive polymer.

6. The negative electrode for a lithium secondary battery of claim 1, wherein the ion conductive polymer includes one or more selected from the group consisting of polyethylene oxide, polyethylene glycol, polypropylene glycol, polypropylene oxide, polyethylene succinate, polyethylene adipate, polyethyleneimine, polyepichlorohydrin, polyβ-propiolactone, polyN-propylaziridine, polyethylene glycol diacrylate, polypropylene glycol diacrylate, polyethylene glycol dimethacrylate and polypropylene glycol dimethacrylate.

7. The negative electrode for a lithium secondary battery of claim 1, wherein the composite material of carbon nanotube-electrically conductive polymer includes the carbon nanotubes in 0.5 parts to 20 parts by weight based on 100 parts by weight of the electrically conductive polymer.

8. The negative electrode for a lithium secondary battery of claim 1, wherein the electrically conductive polymer includes one or more selected from the group consisting of polyaniline, polyethylenedioxythiophene, polyphenylene vinylene, polyacetylene, poly(p-phenylene), polythiophene, poly(3-alkylthiophene), poly(3-alkoxythiophene), poly(crown ether thiophene), polypyrrole, poly(dialkyl-2,2'-bipyridine), polypyridine, polyalkylpyridine, poly(2,2'-bipyridine), poly(dialkyl-2,2'-bipyridine), polypyrimidine, polydihydrophenanthrene, polyquinoline, polyisoquinoline, poly(1,2,3-benzothiadiazole), poly(benzimidazole), poly(quinoxaline), poly(2,3-diarylquinoxaline), poly(1,5-naphthyridine), poly(1,3-cyclohexadiene), poly(anthraquinone), poly(Z-methylanthraquinone), poly(ferrocene), poly(6,6'-biquinoline), polyphenylene sulfide, polyphenylene vinylene, polyindole, polypyrene, polycarbazole, polyazulene, polyazepine, polyfluorene, polynaphthalene and poly3,4-ethylenedioxythiophene-polystyrene sulfonate.

9. A lithium secondary battery comprising the negative electrode of claim 1.

* * * * *